United States Patent [19]

Yamada

[11] Patent Number: 5,076,397
[45] Date of Patent: Dec. 31, 1991

[54] OIL CONDITION CHECKING SYSTEM FOR MARINE PROPULSION UNIT

[75] Inventor: Hironori Yamada, Hamamatsu, Japan

[73] Assignee: Sanshin Kogyo Kabushiki Kaisha, Hamamatsu, Japan

[21] Appl. No.: 575,283

[22] Filed: Aug. 30, 1990

[30] Foreign Application Priority Data

Aug. 30, 1989 [JP] Japan .................................. 1-221631

[51] Int. Cl.⁵ ............................................ F01M 11/10
[52] U.S. Cl. .................................... 184/108; 184/6.4; 123/196 S; 356/70
[58] Field of Search .................. 184/6.1, 6.4, 108; 123/196 S; 340/450.3, 450, 619; 73/64; 356/70; 440/88, 87

[56] References Cited

U.S. PATENT DOCUMENTS

| 4,562,801 | 1/1986 | Koike ............................. 123/196 S |
| 4,570,069 | 2/1986 | Gager ................................. 356/70 |
| 4,649,711 | 3/1987 | Sibley et al. ........................ 356/70 |

FOREIGN PATENT DOCUMENTS

| 0098842 | 6/1982 | Japan ................................. 356/70 |
| 0211707 | 11/1984 | Japan ................................. 184/108 |
| 0236048 | 11/1985 | Japan ................................. 356/70 |
| 0000741 | 1/1986 | Japan ................................. 356/70 |
| 63-314303 | 12/1988 | Japan . |

Primary Examiner—Ira S. Lazarus
Assistant Examiner—Alan B. Cariaso
Attorney, Agent, or Firm—Ernest A. Beutler

[57] ABSTRACT

A lubricant condition sensing unit for the lower unit of a marine propulsion drive. Light is transmitted through the lubricant and the condition and level of the lubricant is sensed by comparing the light signal transmitted with a predetermined value.

5 Claims, 3 Drawing Sheets

ОIL CONDITION CHECKING SYSTEM FOR MARINE PROPULSION UNIT

BACKGROUND OF THE INVENTION

This invention relates to an oil condition checking system for a marine propulsion unit and more particularly to an improved system for determining the condition of lubricant in lubricated machinery.

It is well known that much machinery requires lubrication for its operation. Of course, it is necessary to determine that the quantity of the lubricant is adequate during all running periods and also that the lubricant quality does not deteriorate. With many types of equipment, it is difficult to provide such periodic checks of the quantity and quality of the lubricant.

For example, in the lower unit of a marine outboard drive, it is the conventional practice to provide a lubricant reservoir and to circulate the lubricant over the gear train and some of the components so as to insure smooth operation and long life. However, the only way that the quantity and quality of the lubricant can be tested is to periodically open a drain plug and check both the level and condition of the lubricant. The condition of the lubricant is tested normally by viewing the color of the lubricant. Of course, to determine the quality of the lubricant by its color requires certain expertise and experience. In addition, since the marine outboard drive is normally attached to the transom of a watercraft, this checking method frequently requires removal of the outboard drive unit from the watercraft so that the lubricant can be inspected. Obviously, this procedure is one that is easy to overlook due to the difficulties in making it.

It is, therefore, a principal object of this invention to provide an improved lubricant condition checking system for machinery.

It is a further object of this invention to provide an improved arrangement for checking both the quantity and quality of lubricant in a marine outboard drive without requiring operator experience.

It is yet another object of this invention to provide a lubricant condition checking system for a marine propulsion unit wherein the condition of the lubricant can be monitored continuously.

In addition to requiring replacement of the lubricant when its condition becomes deteriorated or depleted, it is also desirable to insure that the machinery is not continuously operated once the lubricant quality deteriorates. It is, therefore, a still further object of this invention to provide an improved arrangement for protecting the machinery in the event the quality of the lubricant is determined to have deteriorated.

SUMMARY OF THE INVENTION

A first feature of the invention is adapted to be embodied in a lubricant condition sensing unit for a unit having enclosed elements lubricated by a lubricant. The system comprises light emitting means for transmitting light through at least a portion of the lubricant and light receiving means for receiving the light transmitted through the lubricant from the light emitting means. Pre-programmed detecting means are provided for comparing the light signal received by the receiving means to determine the condition of the lubricant.

A further feature of the invention is adapted to be embodied in a method for sensing the condition of lubricant within a unit having enclosed elements lubricated by a lubricant. The method comprises the steps of passing a light through at least a portion of the lubricant and comparing the quality of the light transmitted with predetermined qualities to determine the condition of the lubricant.

DETAILED DESCRIPTION OF THE PREFERRED EMBODIMENT

Figure 1:
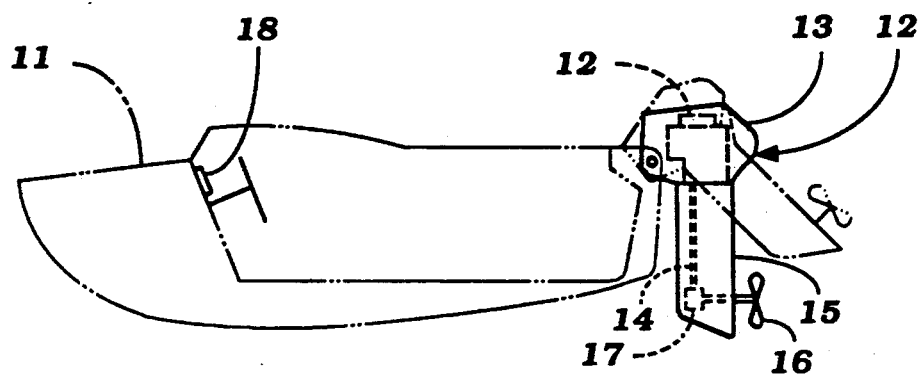
FIG. 1 is a side elevational view of a watercraft, shown in phantom, and powered by a marine propulsion unit having an oil condition checking system constructed in accordance with an embodiment of the invention.

Referring in detail to the drawings and particularly initially to FIG. 1, a watercraft is shown in phantom and is identified generally by the reference numeral 11. The watercraft is powered by an outboard motor, indicated generally by the reference numeral 12, which is mounted on the transom of the watercraft and which is pivotal or movable relative thereto between a normal operating condition, a plurality of trim adjusted positions and a tilted up out of the water condition, the latter position being shown in phantom. The invention is described in conjunction with an outboard motor but it is to be understood that the invention may be employed in conjunction with a wide variety of machinery. However, the invention has particular utility in conjunction with marine outboard drives such as outboard motors or the stern drive portion of an inboard/outboard drive.

The outboard motor 12 includes a power head 13 in which a powering internal combustion engine is contained. This engine drives a drive shaft 14 that is journaled within a drive shaft housing 15 and which drives a propeller 16 through a forward, neutral, reverse transmission, indicated generally by the reference numeral 17, and of a generally conventional type. In accordance with the invention, the outboard motor 12 and specifically its lower unit is provided with an oil condition checking system which illuminates or operates a warning device 18 positioned forwardly of the operator's compartment of the watercraft 11.

Figure 2:
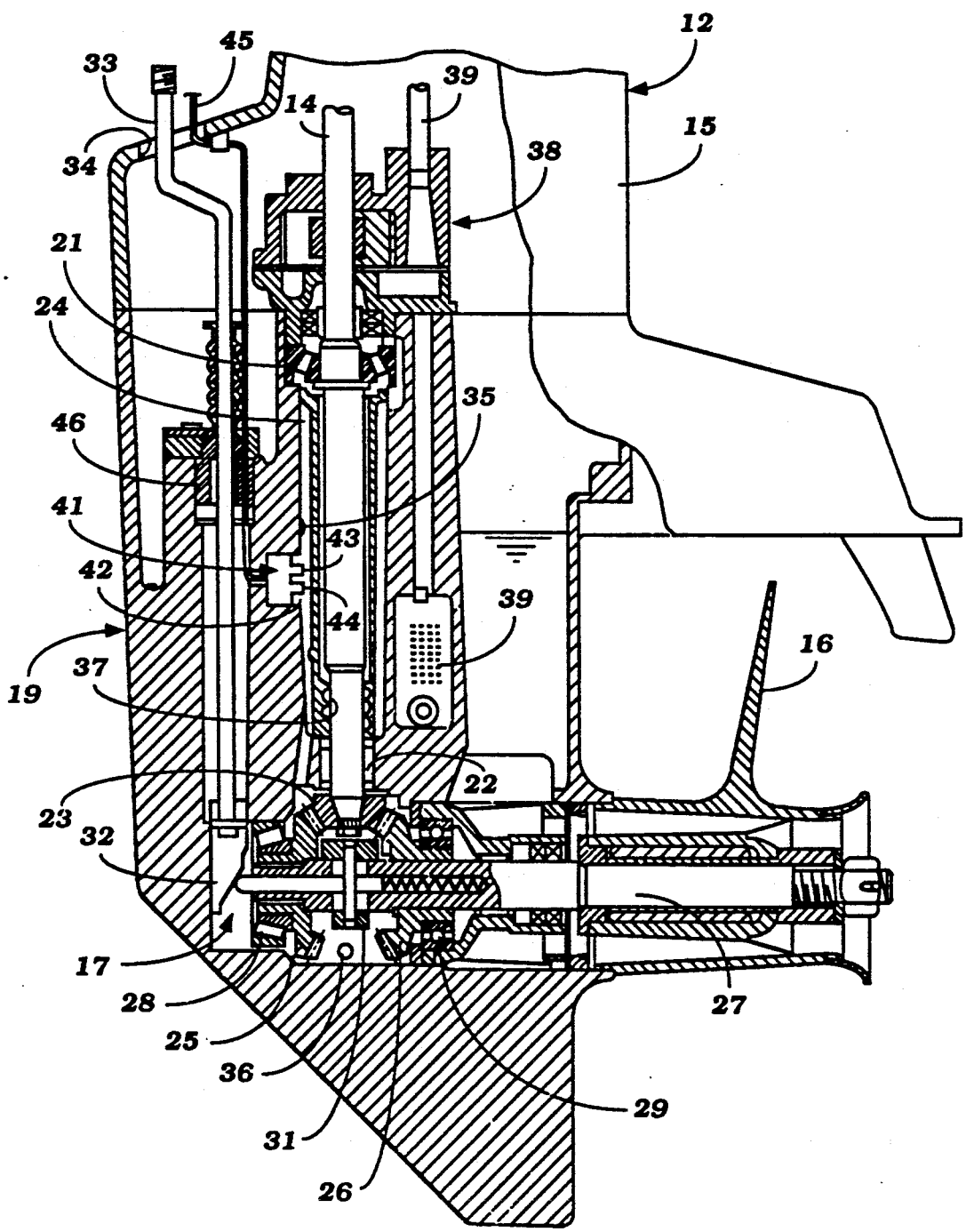
FIG. 2 is an enlarged side elevational view of the lower unit of the marine propulsion unit, with portions broken away so as to more clearly show the construction.

Referring now in detail to FIG. 2, the structure and construction of the outboard drive and specifically the lower unit, indicated generally by the reference numeral 19 and containing the transmission 17, will be described. It will be noted that the drive shaft 14 is supported by an upper thrust bearing assembly 21 and has a depending portion 22 to which a bevel gear 23 is affixed for rotation. This depending drive shaft portion 22 is contained within a sleeve 24 for lubrication purposes, as will become apparent.

The bevel gear 23 is in mesh with and drives a pair of counterrotating bevel gears 25 and 26 that are journaled for rotation on a propeller shaft 27 to which the propeller 16 is affixed. This journaling for the bevel gears 25 and 26 and the journaling for the propeller shaft 27 includes a thrust bearing 28 and an anti-friction bearing 29 that are supported suitably within the lower unit 19.

A dog clutching element 31 is splined to the propeller shaft 27 and is disposed between the bevel gears 25 and 26. This dog clutching element 31 has dog clutching teeth that face the bevel gears 25 and 26 and which can be brought into driving relationship therewith by a slidably supported shift plunger 32 that is connected to a shift rod 33 which is operated in a known manner so as to shift the transmission 17 between a forward drive position, a reverse drive condition and a neutral condition.

The shift rod 33 extends through an opening 34 in the drive shaft housing 15 and is connected to a remote operator (not shown) in a known manner.

A lubricant is contained within the lower unit 19 and is added to this lubricant reservoir through a fill opening 35 having a removable plug. The lubricant may be drained from the lower unit 19 by opening a drain plug 36 formed at the lower area thereof.

The bevel gears 23, 25 and 26 are immersed in the lubricant. Lubricant is also delivered to the bearing 21 for its lubrication by means of a helical portion 37 that is formed at the lower end of the drive shaft portion 22 and which cooperates with the sleeve 26 to permit rotation of the drive shaft 14 to carry lubricant up the sleeve 24 for lubricating the bearing 21. This lubricant then returns to the reservoir previously described through a clearance formed between the outer periphery of the sleeve 24 and the housing of the lower unit 19.

The outboard motor 12 and specifically the engine contained within the power head 13 is provided with a liquid cooling system of a known type. This cooling system includes a coolant pump 38 that is positioned at the interface between the lower unit 19 and the drive shaft housing 15 and which is driven from the drive shaft 14 in a known manner. Lubricant is drawn into the system through an underwater inlet 39 by the pump 38 and is delivered to the engine through a supply conduit 39. This liquid coolant is then returned to the body of water in which the watercraft is operating, through a suitable return passageway.

It should be readily apparent that it is desirable to provide periodic checking of both the quantity of lubricant in the lower unit and also the quality of the lubricant. As has been previously noted, this could only be accomplished with prior art constructions by removing the plug 35 and checking both the quantity of the lubricant and the quality of it through a visual inspection which, as has been noted, depends upon the skill of the person doing the checking.

In accordance with the invention, however, a lubricant detecting system including a detector, indicated generally by the reference numeral 41 is provided in the lower unit 19 for providing an automatic checking of the quantity and quality of the lubricant. This detector 41 is contained within a lubricant passage 42 formed around the sleeve 24 at a point below the normal lubricant level therein and through which lubricant passes on its return to the transmission 17. The detector 41 includes a light emitter 43 and a light receiver 44 that face each other and which are disposed so that lubricant returning from the area around the sleeve 24 will pass by them. That is, the receiver 44 and emitter 43 are normally immersed in lubricant that is circulating through the lower unit 19.

Figure 3:
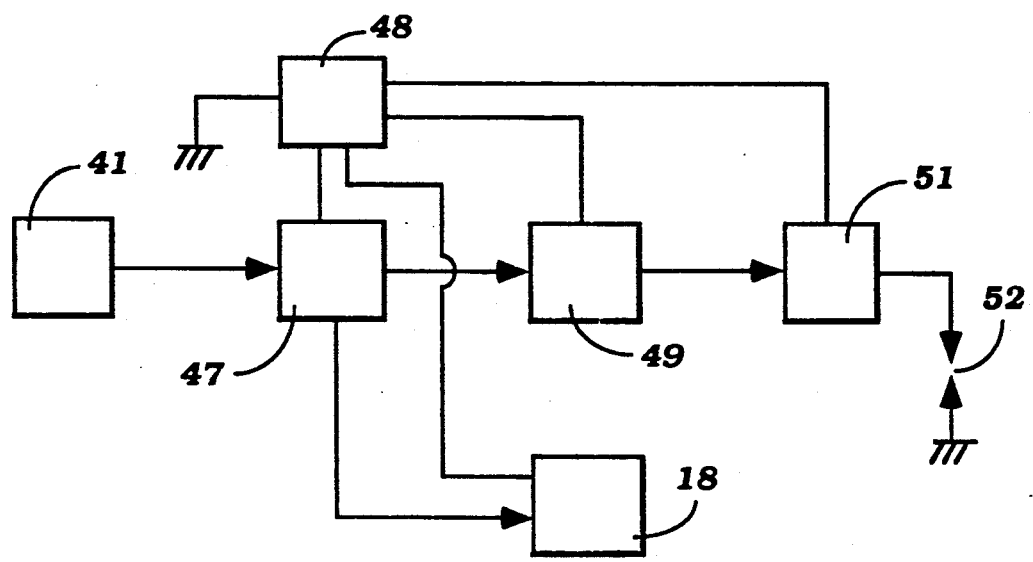
FIG. 3 is a schematic view of the oil condition checking system and the protection circuit associated therewith.

The detector 41 receives electrical power and transmits the signal from the receiver 44 through a conductor 45 that passes through the opening 34 and which is sealed by means of a supporting grommet 46 that extends around the shift rod 33. The circuitry with which the detector 41 is associated is shown schematically in FIG. 3.

This circuit includes an oil condition deciding circuit 47 that is a CPU that is programmed so as to compare the quality of the light transmitted with a predetermined value which is indicative of satisfactory lubricant condition. It should be noted that lubricant which has been oxidized or deteriorated due to the mixing with foreign materials or water which may leak in will decrease the transmission capabilities of the oil and a poor oil condition will be sensed by a reduced transmission in light quantity from the emitter 43 to the receiver 44. On the other hand, if the quantity of lubricant becomes depleted, a greater amount of light will be transmitted and hence low lubricant level can also be detected by the detector 41. The detector 41 and deciding circuit 47 are powered by a power source such as a battery, indicated schematically at 48, and which also powers the warning device 18. The warning deciding circuit 47 also outputs a signal to an ignition control unit 49 which will control the ignition circuit, indicated schematically at 51, so as to either slow the engine or stop it by interrupting or completely terminating the firing of the spark plugs 52. Hence, not only will the oil condition be determined but the lower unit will be protected in the event of an adverse oil condition.

Figure 4:
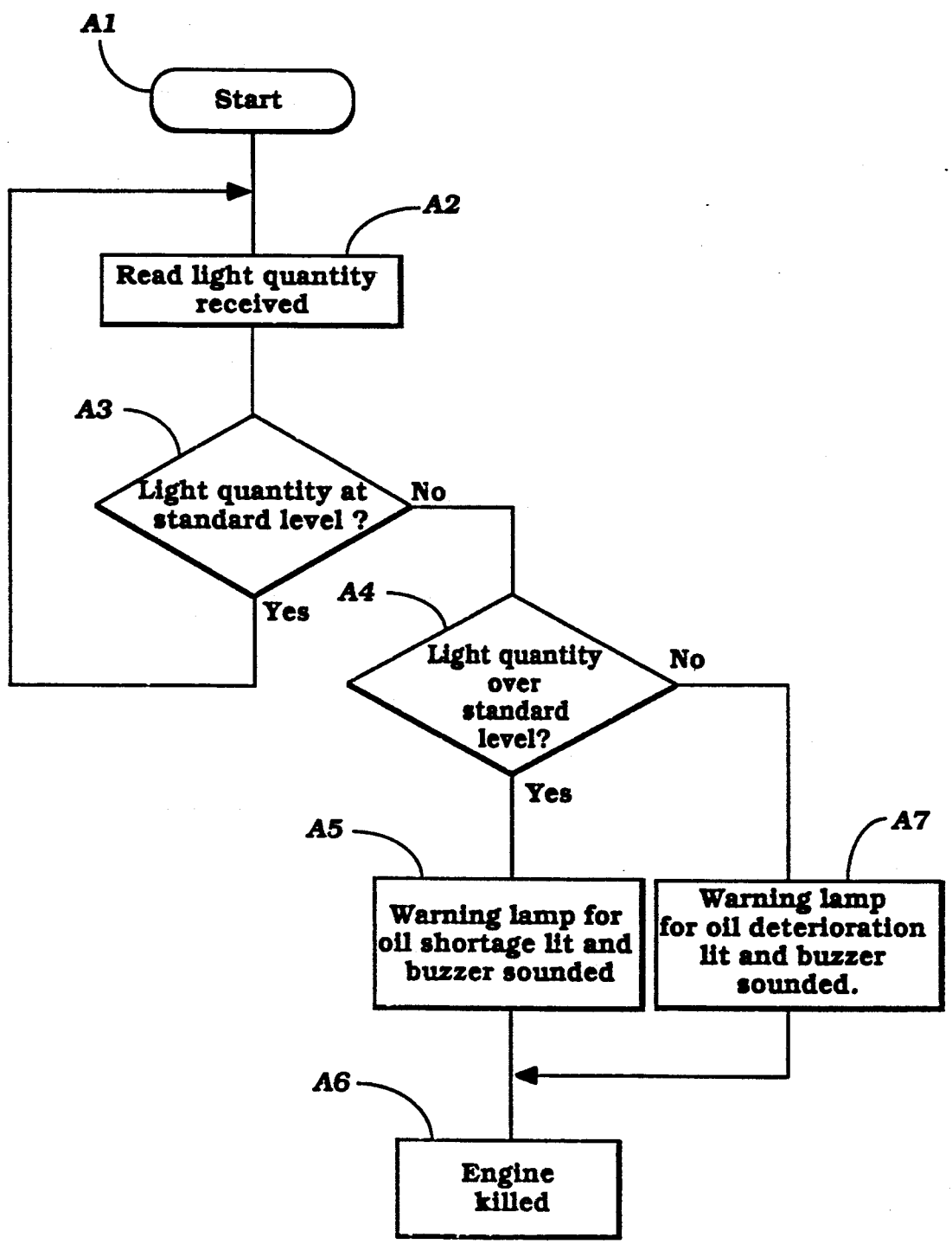
FIG. 4 is a block diagram showing the checking routine and protection routine of the unit.

The routine by which the device operates will now be described by reference to FIG. 4 wherein the program starts at the step $A_1$. After the start, the program moves to the step $A_2$ wherein the light quality is read and tested by the detecting circuit 47 in a manner as already described. The program then moves to the step $A_3$ to make a comparison between the light quantity received by the detector 44 and the normal quantity signal. If the quantity and quality of the light detected is satisfactory, the program repeats back to the step $A_2$.

If, however, the light quantity deviates from the determined normal, the program moves to the step $A_4$ to determine if the light is greater or less than the standard level. If the quantity is greater, then the system determines that the lubricant level is low, for the reasons aforenoted, and moves to the step $A_5$ to illuminate a warning light indicating an oil shortage and also to sound a warning buzzard. The program then moves to the step $A_6$ to initiate protection for the lower unit and specifically the transmission 17 by either reducing engine speed or killing the engine.

If at the step $A_4$ it is determined that the light quantity is not over the standard level, then it is determined at the step $A_7$ that the oil quality has been depleted. It should be remembered that at the step $A_3$ it was determined if the light quantity was different from the standard level and hence the step $A_4$ need only determine if the quantity is above the standard level or not. At the step $A_7$, a warning light is illuminated indicating oil deterioration and a warning buzzard is sounded. The program then moves to the step $A_6$ to initiate the protective procedure by either slowing the engine or killing it.

If should be readily apparent that the described construction is extremely effective in providing an oil condition indicator without requiring operator determination or operator manipulation. Although the invention has been described in conjunction with the lower unit of a marine outboard transmission, it should be understood that the invention may be employed in other applications. However, the described application is that of a preferred embodiment of the invention. Of course, various other changes and modifications may be made without departing from the spirit and scope of the invention, as defined by the appended claims.

I claim:

1. A lubricant condition sensing unit for a marine outboard motor driven lower unit, said lower unit including intermeshing gears for driving a propulsion unit, said gears being lubricated by a lubricant contained within said lower unit comprising light emitting means for transmitting light through at least a portion of the lubricant, light receiving means for receiving the light transmitted through said lubricant from said light emitting means and pre-programmed detecting means for determining the light signal transmitted to said light receiving means for determining the condition of said lubricant.

2. A lubricant condition sensing unit as set forth in claim 1 wherein the lubricant is circulated in a predetermined path through the lower unit.

3. A lubricant condition sensing unit as set forth in claim 2 wherein the light emitting means and light receiving means is positioned in the path of the lubricant being circulated.

4. A lubricant condition sensing unit as set forth in claim 3 wherein the gears comprise a bevel gear forward, neutral, reverse transmission of said lower unit.

5. A lubricant condition sensing unit as set forth in claim 4 further including means for reducing the driving speed of the gears in response to a sensed deterioration of the condition of the lubricant.

* * * * *